(12) United States Patent
Bernacchia et al.

(10) Patent No.: US 7,023,191 B2
(45) Date of Patent: Apr. 4, 2006

(54) VOLTAGE REGULATOR WITH ADJUSTABLE OUTPUT IMPEDANCE

(75) Inventors: Giuseppe Bernacchia, Padova (IT);
Giorgio Chiozzi, Padvoa (IT);
Maurizio Galvano, Padova (IT)

(73) Assignee: Infineon Technologies AG, Munich (DE)

( * ) Notice: Subject to any disclaimer, the term of this patent is extended or adjusted under 35 U.S.C. 154(b) by 163 days.

(21) Appl. No.: 10/804,860

(22) Filed: Mar. 19, 2004

(65) Prior Publication Data
US 2005/0035746 A1  Feb. 17, 2005

(30) Foreign Application Priority Data
Mar. 19, 2003  (DE) .............................. 103 12 221.4

(51) Int. Cl.
*G05F 1/40*  (2006.01)
(52) U.S. Cl. ..................................... 323/282
(58) Field of Classification Search ................ 323/282, 323/283, 284, 285, 351
See application file for complete search history.

(56) References Cited

U.S. PATENT DOCUMENTS

| | | | | |
|---|---|---|---|---|
| 6,064,187 A * | 5/2000 | Redl et al. ................... | 323/285 |
| 6,069,471 A | 5/2000 | Nguyen | |
| 6,229,292 B1 | 5/2001 | Redl et al. | |
| 6,580,258 B1 * | 6/2003 | Wilcox et al. ............... | 323/282 |
| 6,696,825 B1 * | 2/2004 | Harris et al. ................ | 323/282 |
| 6,828,766 B1 * | 12/2004 | Corva et al. ................ | 323/284 |
| 6,894,471 B1 * | 5/2005 | Corva et al. ................ | 323/282 |

OTHER PUBLICATIONS

Gadoura et al., "New Methodology for Design, Analysis, and Validation of DC/DC Converters Based on Advanced Controllers," The 21st International Telecommunications Energy Conference, IEEE, 1999, (7 pages).
Lenk, R., "Understanding Droop and Programmable Active Droop", Application Bulletin AB-24, Fairchild Semiconductor, 2000, (8 pages).

* cited by examiner

*Primary Examiner*—Adolf Berhane
(74) *Attorney, Agent, or Firm*—Maginot, Moore & Beck

(57) ABSTRACT

The invention relates to a voltage regulator having an output terminal (AK) for the provision of an output voltage and connection of a load, an output capacitor (20) connected to the output terminal and having an equivalent series resistance (ESR), a converter unit (10) having supply voltage terminals for the application of a supply voltage (Vcc), an output coupled to the output terminal (AK), a feedback signal input for feeding in a feedback signal (Vfb) dependent on the output voltage, a reference signal input for feeding in a reference signal (Vref), and a comparator unit (TA3), which provides a differential signal (Iea) from the reference signal (Vref) and the feedback signal (Vfb), in which case the converter unit (10) provides an output current (Iout), the mean value of which is proportional to the differential signal (Iea), the proportionality factor between this difference and the output current (Iout) being set by means of a control signal at a control input of the converter unit (10) in such a way that it is proportional to the reciprocal of the equivalent series resistance (ESR) of the output capacitor.

20 Claims, 4 Drawing Sheets

VOLTAGE REGULATOR WITH ADJUSTABLE OUTPUT IMPEDANCE

FIELD OF THE INVENTION

The present invention relates to a voltage regulator having an output terminal and also having a clocked converter unit.

BACKGROUND

Examples of prior art voltage regulators are described for example in U.S. Pat. Nos. 6,229,292 B1 or 6,069,471.

Such a voltage regulator is described for example in U.S. Pat. Nos. 6,229,292 B1 or 6,069,471.

In the case of such voltage regulators, the converter unit provides an output current which brings about a voltage drop across the parallel circuit formed by the output capacitor and the load, said voltage drop corresponding to the output voltage. Via the feedback path, load-dictated fluctuations in the output voltage are readjusted in a known manner in that, in the event of a decrease in the output voltage, the power consumption of the regulator is increased and the average output current is increased and in that, in the event of a rise in the output voltage, the power consumption of the regulator is reduced and the average output current is reduced. In the voltage regulator of the generic type, the output capacitor serves as a buffer for reducing fluctuations in the output voltage in the case of load changes of the load connected to the output terminal and in particular in the case of converter units with a switching converter for smoothing the output current.

Since the converter unit can react to load changes only with a time delay, abrupt load changes lead to momentary fluctuations in the output voltage, as is illustrated with reference to FIGS. 1 and 2. In FIG. 1, AK designates the output terminal of a converter unit of arbitrary configuration, which provides an output current Iout for a parallel circuit formed by a buffer capacitor 20 and a load, said output current Iout bringing about a voltage drop Vout across the parallel circuit. FIG. 1 shows the electrical equivalent circuit diagram of the output capacitor 20, which comprises a capacitor component, represented by the capacitor C, and a resistive component ESR connected in series with the capacitive component C. In this case, the resistive component ESR takes account of unavoidable conduction losses of a real capacitor.

Consideration will now be given to the case illustrated in the figure, in which, in the open-circuit case, an output voltage Vout having a nominal value Vout_nom is set, no current or only a very small current being required to maintain said output voltage. If, at an instant t0, the current consumption I of the load rises rapidly owing to a load change, then this current requirement can initially be covered only by the output capacitor 20, the current which is drawn from the capacitor 20 and initially corresponds to the load current now taken up bringing about, across the equivalent resistance of said capacitor, a voltage drop ΔU resulting from the product of the resistance ESR and the current change ΔI (in the present case ΔI=Imax). The output voltage Vout thereby decreases by the value ΔU. The power consumption of the converter unit is thereupon readjusted until the output current Iout is adapted to the changed load conditions and the nominal voltage Vout_nom is again present at the output. If, at an instant t1, the current consumption of the load falls from the value Imax to zero owing to an open circuit, then only the output capacitor 20 is momentarily able to take up the output current adapted to the load conditions prevailing until then, which leads to an output voltage increased by the voltage drop ΔU=ΔI·ESR=Imax·ESR. The output current is thereupon readjusted until the output current Iout is zero.

To summarize, in the case of a maximum current consumption of the load of Imax, fluctuations in the output voltage Vout of Δout=2·Imax·ESR can thus occur.

In order to reduce the fluctuations in the output voltage, Ron Lenk: "Understanding Droop and Programmable Active Droop", Application Bulletin AB-24, Fairchild Semiconductor, FIG. 3, discloses connecting a resistor downstream of the output of the converter, across which resistor the output current likewise brings about a voltage drop and which resistor, in the event of a change in the current consumption of the load, accepts a part of the resultant voltage fluctuations, so that the actual output voltage corresponds to the nominal value of the output voltage minus the voltage drop across the resistor.

In the abovementioned publications U.S. Pat. Nos. 6,229,292 B1 and 6,069,471, in order to reduce such voltage fluctuations in the output voltage, provision is made for reducing a reference value Vref1, depending on which the output voltage or the output current is set, in accordance with $$Vref1 = Vref - I \cdot ESR \qquad (1),$$

where Vref is a constant reference value, I is the load current and ESR is the equivalent resistance. In the case of a large current requirement of the load, which, in the case of a load change, would bring about a correspondingly large change in voltage across the equivalent resistance, the reference value Vref1 is in this case reduced in order to correspondingly reduce the output voltage and the output current and thereby to reduce the fluctuation range of the output voltage in the case of a load change.

It is an aim of the present invention to provide a voltage regulator having an output capacitor connected to an output terminal and having an equivalent resistance in which a fluctuation range of the output voltage in the case of load changes of a load connected to the voltage regulator is reduced.

SUMMARY

This aim is achieved by a voltage regulator in accordance with the invention.

This aim is achieved by means of a voltage regulator in accordance with the features of claim 1. The subclaims relate to advantageous refinements of the invention.

The voltage regulator according to the invention comprises an output terminal for the provision of an output voltage and connection of a load, an output capacitor connected to the output terminal and having an equivalent series resistance, and a converter unit. The converter unit comprises supply voltage terminals for the application of a supply voltage, an output coupled to the output terminal of the voltage regulator, and a feedback signal input for feeding in a feedback signal dependent on the output voltage, an input for feeding in a reference signal. The converter unit is designed to provide an output current, the mean value of which is proportional to the difference between the reference signal and the feedback signal, the proportionality factor between this difference and the output current being adjustable by means of a control signal at a control input of the converter unit.

Preferably the control signal is selected in such a way that said proportionality factor is at least approximately proportional to the reciprocal of the equivalent series resistance and preferably corresponds to said reciprocal.

A voltage regulator having a converter unit configured in this way has a transfer response in which the supply voltage set at the output for the load decreases as the load current increases, in order overall to reduce fluctuations in the output voltage which result, in the case of sudden load changes, from the voltage drop across the equivalent series resistance.

The proportionality factor between the difference formed from reference signal and feedback signal and the output current corresponds to the transconductance of the voltage regulator. The setting of this transconductance by means of an external control signal by way of the gain factor of the comparator unit enables the voltage regulator to be flexibly adapted to the equivalent series resistance of the output capacitor currently connected.

The converter unit furthermore comprises a switching converter having an inductive component, for example a coil, and a switching unit, the switching unit serving for the clocked connection of the inductive component to the supply voltage according to a pulse-width-modulated signal. In order to provide this pulse-width-modulated signal, a pulse width modulator is present, which provides the pulse-width-modulated signal according to a regulation signal dependent on a differential signal. A comparator unit provides said differential signal from the reference signal and the feedback signal. This regulation signal fed to the pulse width modulator is preferably dependent on the differential signal and on a signal dependent on the output current of the converter unit, said output current corresponding to the current through the inductance.

The pulse width modulator preferably comprises a comparator with switching hysteresis, to which the regulation signal is fed and which provides the pulse-width-modulated signal depending on a comparison of the regulation signal with a first and second threshold value.

BRIEF DESCRIPTION OF THE DRAWINGS

The present invention is explained in more detail below in exemplary embodiments with reference to figures, in which.

In the figures, unless specified otherwise, identical reference symbols designate identical parts, signals and components with the same meaning.

DETAILED DESCRIPTION

Figure 3:
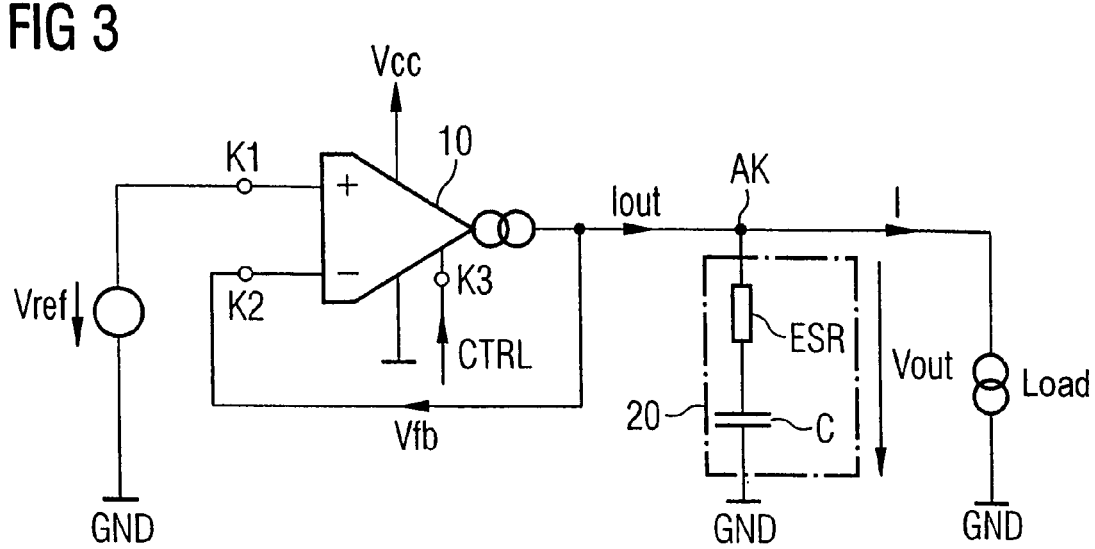
FIG. 3 shows an exemplary embodiment of a voltage regulator according to the invention.

FIG. 3 shows a voltage regulator having an output terminal AK for the connection of a load and for the provision of an output voltage Vout and an output current Iout for the load. In the example, the load is connected to the output terminal AK and a reference-ground potential GND. An output capacitor 20 is connected in parallel with the load, and comprises a capacitive component, represented by a capacitor C, and a series-connected resistive component, which is represented by a resistance ESR and is also referred to as the equivalent series resistance of the output capacitor 20. Hereinafter, "ESR" is used both as reference symbol for the resistance and as a measure of the value of said resistance.

Figure 1:
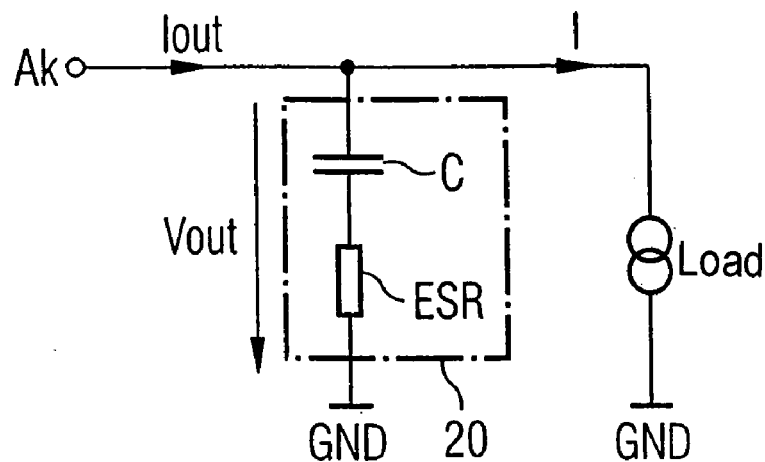
FIG. 1 shows a parallel circuit formed by a load and a capacitor having an equivalent series resistance, which is supplied by means of an output current.
Figure 2:
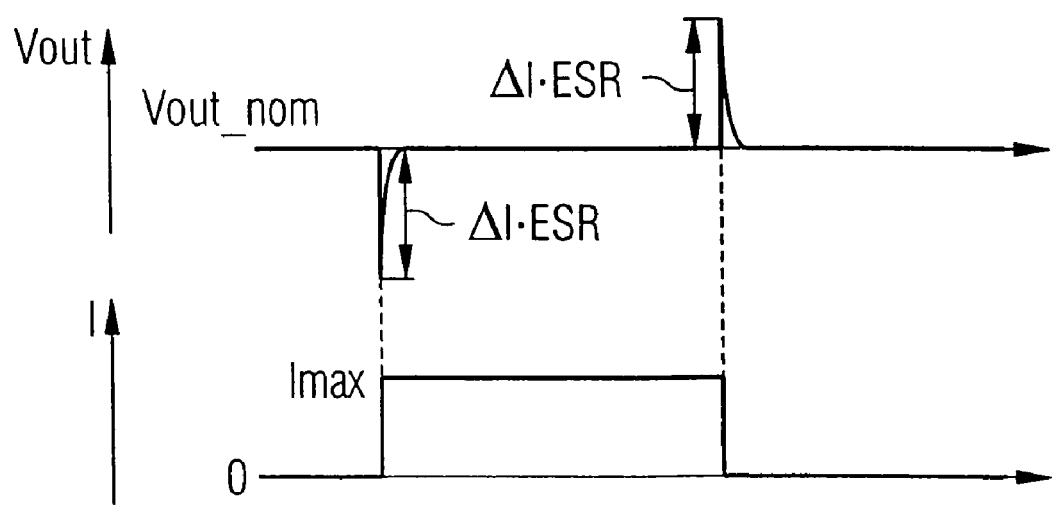
FIG. 2 shows a diagrammatic illustration of the output voltage (Vout) and of the output current (Iout) in the case of maximum fluctuations in the current consumption of the load in the case of an output voltage regulated independently of the load.

The voltage regulator comprises a converter unit 10 having supply voltage terminals for the application of a supply voltage Vcc, an output, which is coupled to the output terminal AK and at which the output current Iout is available, and also a feedback signal input K2 for feeding back a signal Vfb, which is dependent on the output voltage Vout and corresponds to the output voltage Vout in the example in accordance with FIG. 1. Moreover, the converter unit 10 comprises a reference voltage input, at which a reference voltage signal Vref provided by a reference voltage source is present.

The voltage converter unit 10 is designed to provide an output current Iout dependent on the difference between the reference voltage signal Vref and the feedback signal Vout, the following holding true:

$$Iout = (Vref - Vout) \cdot Gm \qquad (2),$$

where Gm is the transconductance of the converter unit 10, which is set by a control signal CTRL present at a control input K3.

In a preferred embodiment the control signal is selected such that for said transconductance set by means of the control signal CTRL, it holds true here that, at least approximately, Gm=1/ESR.

Figure 4A:
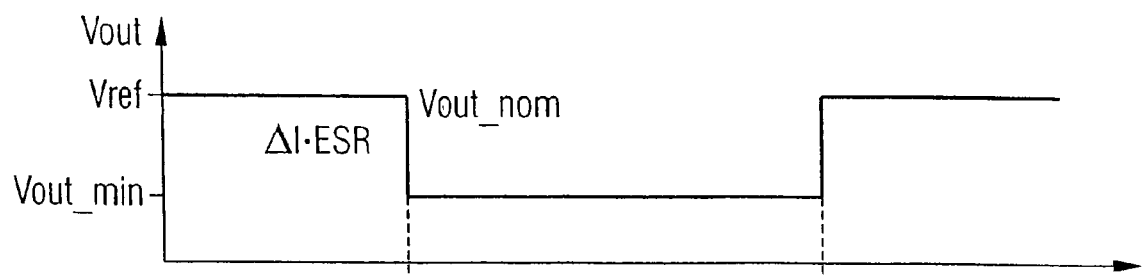
FIG. 4 shows temporal profiles of the output voltage and of the load current in the case of the voltage regulator in accordance with FIG. 3.
Figure 4B:
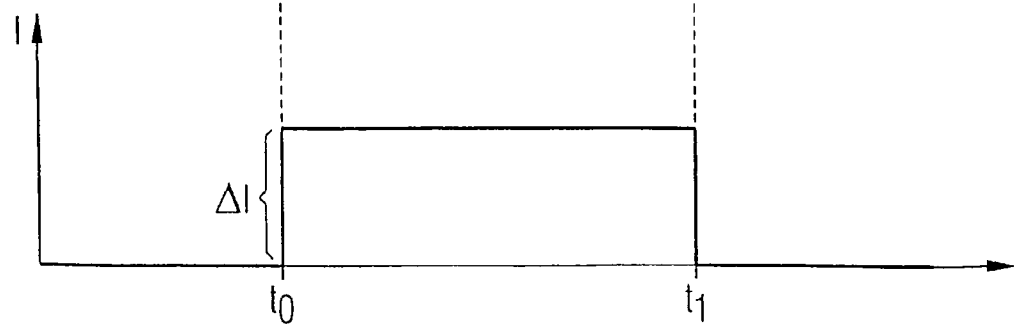

The effects of such a transconductance Gm adapted to the value of the equivalent series resistance ESR are explained below with reference to FIG. 4, FIG. 4*a* illustrating the temporal profile of the output voltage Vout and FIG. 4*b* the temporal profile of the output current Iout under the condition that the output current Iout is generated in a manner dependent on the output voltage Vout in accordance with (2). In addition, it is assumed for the purposes of the explanation in FIG. 4 that regulation fluctuations which arise from fluctuations in the load current are disregarded.

Firstly, it shall be assumed that the current consumption I of the load in accordance with FIG. 3 is zero. In this case, the nominal value Vout_nom is established as output voltage Vout, said nominal value corresponding to the reference voltage Vref in the example. If, at an instant t0, the current consumption rises abruptly to a value Imax, corresponding to the maximum permissible current consumption of the load, then the output voltage Vout, owing to the voltage drop across the equivalent series resistance ESR, falls to a value Vout_min, for which the following holds true:

$$Vout\_min = Vref - Imax \cdot ESR \qquad (3).$$

Owing to the regulation in accordance with equation (2) where Gm=1/ESR, given a current Imax, the output voltage is adjusted to the value Vout_min in accordance with (3), so that the output voltage remains at the value Vout_min in the case of a high current consumption Imax of the load. For the sake of simplicity, the delays caused by the regulation are not illustrated in FIG. 4.

If, at the instant t1, the current consumption falls abruptly to zero then the output voltage Vout rises immediately, owing to the voltage obtained across the equivalent series resistance ESR, by the value ΔU=Imax·ESR to the value Vref and is subsequently adjusted to this value in accordance with (1) owing to the current consumption zero of the load.

Taking account of the two extreme cases, maximum current consumption Imax of the load and current consumption zero of the load, and under the simplifying assumption, made for explanation purposes, that transitions between these load situations may be effected abruptly, the result, as has been explained with reference to FIG. 4, is an output voltage Vout which fluctuates between Vref=Imax·ESR and Vref and thus has an output voltage swing of only ΔVout=Imax·ESR.

The control terminal K3 for setting the transconductance Gm by means of the control signal CTRL enables the converter unit 10 to be flexibly adapted to output capacitors 20 having different equivalent series resistances ESR with the aim of always setting the transconductance Gm to the reciprocal of the equivalent series resistance ESR in order to obtain a maximum voltage swing of the output voltage Vout of ΔVout=Imax·ESR.

Figure 5:
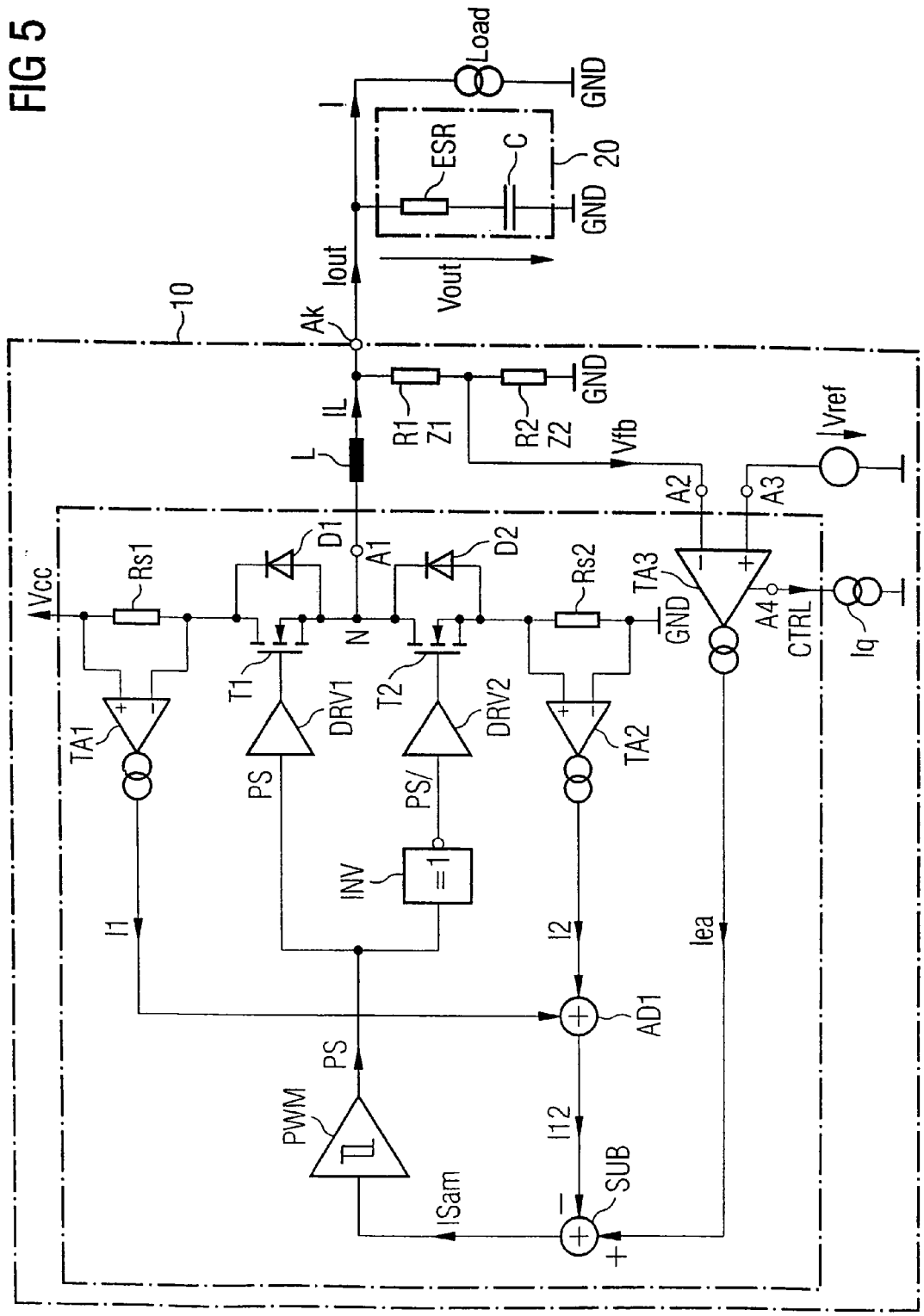
FIG. 5 shows a voltage regulator having a converter unit illustrated in detail, said converter unit comprising a switching converter.

FIG. 5 shows an exemplary embodiment of a converter unit 10 having a control input K3 for setting the transconductance of the converter unit 10.

The converter 10 according to FIG. 5 is designed as a buck converter, the fundamental circuit topology of which is known. The converter 10 comprises a series circuit—connected between a terminal for supply potential Vcc and the output terminal AK—of a first switch T1 driven in clocked fashion and a coil L, and a freewheeling element connected between a node N common to the first switch T1 and the coil and reference-ground potential GND. In a known manner, the coil L takes up energy when the first switch T1 is closed, and outputs said energy to the load when the first switch T1 is subsequently open. When the first switch T1 is open, the freewheeling element T2 enables commutation of the coil L.

The first switch T1 and the freewheeling element are in each case designed as a MOSFET, which are driven complementarily with respect to one another according to a pulse-width-modulated signal PS. The two MOSFETs T1, T2 have freewheeling diodes, so that the second MOSFET T2 immediately serves as a freewheeling element for the coil current, if the first MOSFET turns off, still before the second MOSFET T2 is driven completely in the on state, in order subsequently to reduce the losses resulting from the freewheeling current.

The converter furthermore comprises a feedback path having a voltage divider R1, R2, which is connected between the output terminal AK and reference-ground potential GND and provides a feedback signal Vfb, which is related to the output voltage Vout as follows:

$$Vfb = R2/(R1+R2) \cdot Vout = Vout/Afb \quad (4),$$

where 1/Afb designates the divider ratio of the voltage divider Z1, Z2, which may be constructed from ohmic resistors or any other passive components. By means of a differential amplifier TA3, the inverting input of which is fed the feedback signal Vfb and the noninverting input of which is fed a reference signal Vref, said feedback signal Vfb is compared with the reference signal Vref. In the example, the differential amplifier TA3 is designed as a transconductance amplifier (OTA) which provides an output current Iea, for which the following holds true:

$$Iea = Gmea \cdot (Vref - Vfb) \quad (5),$$

where Gmea is the gain or transconductance of the amplifier TA3, which can be set by means of a control signal CTRL at a control input of the amplifier TA3. Said control signal CTRL, which will be discussed below, is a current signal provided by a current source Iq and serves for setting the total transfer response of the converter 10.

Preferably the control signal CTRL is selected to set the transfer function in such a way that the relationship (1) is fulfilled. In the exemplary embodiment, the control signal CTRL is generated by way of example by a current source Iq, but may also be generated by an arbitrary further control signal generating circuit.

A pulse width modulator PWM is present for providing drive signals PS and PS/ for the first MOSFET T1, serving as a high-side switch, and the second MOSFET T2, serving as a low-side switch. The pulse width modulator PWM provides a pulse-width-modulated signal PS according to a regulation signal Isum, said pulse-width-modulated signal driving the gate terminal of the first MOSFET T1 via a first driver circuit DRV1. The second MOSFET T2 is driven complementarily with respect to the first MOSFET T1. For this purpose, the pulse-width-modulated signal PS is inverted by means of the inverter INV in order to generate a pulse-width-modulated signal PS/, this inverted signal PS/ driving the gate of the second MOSFET T2 via a second driver circuit DRV2. Without restricting the generality, it is assumed hereinafter that the MOSFETs T1, T2 in each case turn on if the associated drive signal PS, PSI has a high level or an upper drive level, and that the MOSFETs T1, T2 turn off in the case of a low level.

The driver circuits serve to convert the levels of the pulse-width-modulated signals to suitable levels for driving the MOSFETs T1, T2.

A first current sensing resistor Rs1 is connected in series with the first MOSFET T1, a voltage drop—caused by a current flow when the first MOSFET T1 is in the on state—across said first current sensing resistor Rs1 being detected by a first measuring amplifier TA1. The measuring amplifier TA1 is designed as a transconductance amplifier which provides a current 11 as measurement signal, said current I1 being proportional to a current through the first MOSFET T1.

In a corresponding manner, a second current sensing resistor Rs2 is connected in series with the second MOSFET T2, a voltage drop—brought about when the second MOSFET T2 is in the on state—across said second current sensing resistor Rs2 being detected by a second measuring amplifier TA2. In a manner corresponding to the first measuring amplifier, the second measuring amplifier TA2 is designed as a transconductance amplifier which provides a current 12 as measurement signal, said current 12 being proportional to a current through the second MOSFET T2.

The two current sensing resistors Rs1, Rs2 preferably have the same resistance Rs and the two measuring amplifiers TA1, TA2 preferably have an identical gain or transconductance Gcs, which results in an identical total gain of the two arrangements having in each case a current sensing resistor Rs1, Rs2 and a measuring amplifier, which is designated hereinafter by Ai and for which the following holds true:

$$Ai = Gcs \cdot Rs \quad (6).$$

The two measurement currents I1 and I2 of the measuring amplifiers TA1, TA2 are fed to an adder AD1, which provides a measurement current I12, for which the following holds true:

$$I12=I1+I2 \quad (7).$$

Since only one of the two MOSFETs T1, T2 in each case turns on at the same point in time, only one of the measurement currents I1, I2 in each case is not equal to zero, while the other is equal to zero. Furthermore, the current through the MOSFET T1 or T2 which is respectively in the on state can only flow via the coil L, since the respective other MOSFET then turns off. The coil current IL is thus proportional to the measurement current formed from the measurement currents I1 and I2, the following holding true:

$$IL=I12/Ai=(I1+I2)/Ai \quad (8),$$

where Ai is the gain factor of the current measuring arrangements as already explained above. In addition to this explained possibility for measuring the coil current IL by means of the resistors Rs1, Rs2 connected in series with the semiconductor switches T1, T2, it is possible, of course, to use arbitrary further current measuring arrangements which provide a measurement signal dependent on the coil current IL.

The regulation signal Isum fed to the pulse width modulator PWM is formed, by means of a subtractor SUB, from the output signal Iea of the amplifier TA3 located in the feedback path and the current measurement signal I12 proportional to the coil current IL, the following holding true for the regulation signal:

$$Isum=Iea-I12=Iea-A1 \cdot IL \quad (9).$$

Figure 6:
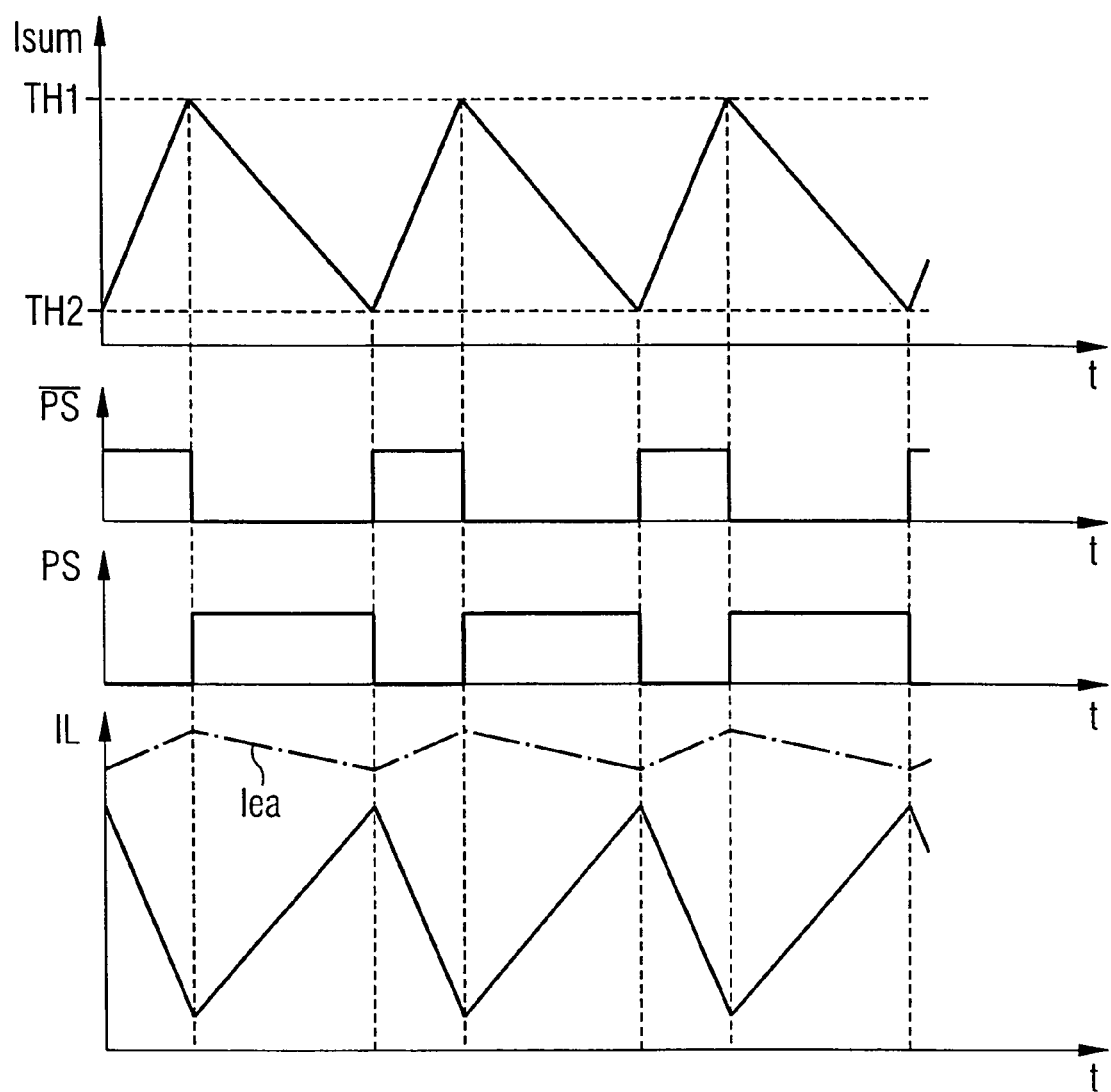
FIG. 6 shows exemplary temporal profiles of selected signals depicted in FIG. 5.

The pulse width modulator PWM comprises a comparator unit with a switching hysteresis, as is explained with reference to the method of operation of the pulse width modulator in FIG. 6. In this case, FIGS. 6a–c show the temporal profile of the regulation signal Isum and the temporal profiles of the pulse-width-modulated signal PS and of the inverted pulse-width-modulated signal PS/. The pulse width modulator PWM takes account of an upper switching threshold TH1 and a lower switching threshold TH2 in the generation of the pulse-width-modulated signal PS, the pulse width modulator generating a low level of the pulse-width-modulated signal PS if the regulation signal Isum rises and is less than the upper switching threshold TH1. It shall be assumed that the output voltage Vout and thus the output signal of the feedback amplifier TA3 are subjected to only small fluctuations and/or only fluctuations which have a significantly greater period duration than the pulse-width-modulated signals PS, PS/, and that Iea is always greater than I12. A low level of the pulse-width-modulated signal PS then leads to a rise in the regulation signal Isum, since, in the case of a low level of the pulse-width-modulated signal, the first MOSFET T1 turns off and the second MOSFET T2 turns on, as a result of which the coil L commutates and the coil current IL decreases.

If the summation signal reaches the upper switching threshold TH1, then a high level of the pulse-width-modulated signal PS is generated. As a result of this, the first MOSFET T1 is turned on and the second MOSFET T2 turns off, as a result of which the coil L takes up current via the first MOSFET T1 from supply potential Vcc and the coil current IL rises, with the consequence that the regulation signal Isum decreases. If the regulation signal Isum reaches the lower threshold, then the pulse-width modulated signal PS assumes a low level again in order thereby to open the high-side MOSFET T1 and to close the low-side MOSFET T2 and to commutate the coil L with the consequence that the coil current IL decreases and the regulation signal rises again.

The overall result is a triangular profile of the coil current IL, as is illustrated in FIG. 6d. This FIG. 6d additionally shows the profile—dependent on the output voltage Vout—of the signal Iea, which, in the example with the triangular output current Iout, is subject to small, likewise triangular, fluctuations.

The output capacitor 20 averages said triangular coil current IL, so that, in the steady-state condition, the current Iout taken up by the load corresponds to the average value <IL> of the coil current IL, in other words the following holds true:

$$Iout=<IL> \quad (10),$$

where <.> hereinafter represents averaging.

The following holds true for the output current Iea of the feedback amplifier TA3:

$$Iea=Gmea \cdot (Vref-Vfb)=Gmea \cdot \Delta Vfb=Gmea \cdot (Vref-Vout/Afb) \quad (11),$$

where Gmea is the transconductance of the feedback amplifier TA3, which can be set externally by means of the control signal CTRL. The regulating arrangement with the feedback amplifier TA3, which overall has a proportional regulating behavior, adjusts the output voltage Vout to a nominal value Vout_nom in the open-circuit case, the following holding true in said open-circuit case:

$$\Delta Vfb=(Vref-Vout\_nom/Afb)=0, \text{ i.e. } Vout\_nom=Vref \cdot Arb \quad (12).$$

For $\Delta Vfb=0$, it correspondingly holds true, owing to (11), that the output current Iea of the amplifier KA3 is zero, i.e. Iea=0. The following holds true for the output voltage Vout:

$$Vout=Vout\_nom-\Delta Vout \quad (13),$$

where $\Delta Vout$ represents a deviation of the output voltage Vout with respect to the nominal value Vout_nom. Inserting (12) and (13) into (11) and transforming then yields:

$$\Delta Vout=Afb \cdot \Delta Vfb \quad (14).$$

For the converter unit illustrated, in the steady-state situation, the equilibrium condition furthermore holds true, according to which the mean value of the current Iea at the output of the feedback amplifier TA3 is equal to the mean value of the current I12, i.e. $<Iea>=<I12>=Ai \cdot <IL>$. Taking account of this equilibrium condition, it is possible, using (11) to write the mean value of the output current IL as:

$$Iout=<IL>=Gmea \cdot \Delta Vout/(Afb \cdot Ai) \quad (15).$$

The transconductance Gm of the system illustrated in FIG. 4 can thus be represented, on the basis of the known gain of the feedback amplifier TA3, the gain Afb of the feedback path and the gain factor Ai, which maps the mean value of the signal Iea onto the output current Iout, in accordance with $$Gm=Gmea/(Ai \cdot Afb) \quad (16).$$

Referring to the general explanations concerning FIG. 1, the following holds true for this transconductance:

$$Gm=1/ESR \quad (17),$$

in order to obtain the desired reduction of the overall fluctuation range of the output voltage Vout.

In order to set the transconductance Gm to this desired value, provision is made, in the circuit in accordance with FIG. 4, for setting the gain or transconductance Gmea of the feedback amplifier TA3, in a manner adapted to the value of the equivalent series resistance ESR, externally by means of the control signal CTRL, which corresponds to a current supplied by the current source Iq. Assuming that the transconductance of this amplifier has a constant component Gmea0 and a component dependent on the control signal CTRL, the following holds true:

$$Gmea = Gmea0 + \alpha \cdot CTRL \quad (18),$$

where $\alpha$ is a constant. From (16), (17) and (18), it follows for said control signal CTRL $$CTRL = (1/ESR - Gmea0/(Ai \cdot Afb)) \cdot (Ai \cdot Afb/\alpha) \quad (19),$$

in order to meet the required condition that the transconductance of the converter unit 10 is inversely proportional to the value of the equivalent series resistance.

The converter unit 10 preferably comprises an integrated circuit IC in which are integrated all of the components explained with the exception of the coil L, the voltage divider R1, R2, the voltage source supplying the reference signal Vref, and the current source Iq supplying the adjustable current signal CTRL. These components are connected to connecting terminals A1, A2, A3, A4 of the integrated circuit IC.

The essential aspect of the present invention consists in setting the gain or the transconductance of the converter unit 10 by way of the gain of the feedback amplifier by means of an external signal CTRL in such a way that said transconductance is inversely proportional to the reciprocal of the equivalent series resistance ESR.

The converter unit is not restricted to the concrete configuration in FIG. 5, in which there is a pulse width modulator with a switching hysteresis to which is fed a regulation signal dependent on the differential signal Iea and the coil current IL.

Thus, it is also possible to provide, instead of the pulse width modulator PWM with switching hysteresis, an adequately known pulse width modulator which generates a sawtooth signal internally and compares said sawtooth signal with the regulation signal Isum in order to generate the pulse-width-modulated signals, the pulses of the pulse-width-modulated signal beginning in time with the sawtooth signal and in each case ending when the sawtooth signal reaches the regulation signal Isum.

The invention claimed is:

1. A voltage regulator comprising:
    an output terminal operably connected to provide an output voltage to a load,
    an output capacitor connected to the output terminal, the output capacitor having an equivalent series resistance,
    a converter circuit having supply voltage terminals for the application of a supply voltage, an output coupled to the output terminal, a feedback signal input coupled to receive a feedback signal that is representative of the output voltage, a reference signal input coupled to receive a reference signal, and a control input operable to receive a control signal,
    wherein the converter unit is configured to provide an output current having a mean value that is proportional to a difference between the reference signal and the feedback signal, the proportionality between the difference and the output current mean value being adjustable dependent upon the control signal.

2. The voltage regulator as claimed in claim 1, wherein the control signal corresponds to the equivalent series resistance of the output capacitor.

3. The voltage regulator as claimed in claim 2, wherein the control signal causes the proportionality to be proportional to the reciprocal of the equivalent series resistance of the output capacitor.

4. The voltage regulator as claimed in claim 1 further comprising a comparator unit configured to generate a differential signal from the reference signal and the feedback signal, and wherein the converter unit is configured to provide the output current based at least in part on the differential signal.

5. The voltage regulator as claimed in claim 4, wherein the converter unit further comprises:
    a switching converter having an inductance and a switching unit providing clocked connection of the inductance to the supply voltage in accordance with a pulse-width-modulated signal,
    a pulse width modulator configured to generate the pulse-width-modulated signal responsive to a regulation signal, the regulation signal being dependent on the differential signal.

6. The voltage regulator as claimed in claim 5, wherein the regulation signal is dependent on the differential signal and a further signal, the further signal dependent on the output current.

7. The voltage regulator as claimed in claim 6, wherein the regulation signal is dependent on a difference between the differential signal and the further signal.

8. The voltage regulator as claimed in claim 5, wherein the pulse width modulator further comprises a comparator unit having switching hysteresis, the comparator unit operably coupled to receive the regulation signal, the comparator unit operable to configure the pulse-width-modulated signal dependent upon a comparison of the regulation signal with a first and second threshold value.

9. The voltage regulator as claimed in claim 4 wherein the comparator unit includes the control input, and wherein the comparator unit is operable to set a gain factor based on the control signal.

10. The voltage regulator as claimed in claim 1, wherein the control signal is configured to correspond to the equivalent series resistance of the output capacitor.

11. The voltage regulator as claimed in claim 10, wherein the control signal is configured to cause the output current to have a mean value that is proportional to a difference between the reference signal and the feedback signal.

12. The voltage regulator as claimed in claim 11, wherein the control signal is configured to cause the output current to have a mean value that is proportional to the reciprocal of the equivalent series resistance of the output capacitor.

13. The voltage regulator as claimed in claim 10, wherein the regulation signal is dependent on the differential signal and a further signal, the further signal dependent on the output current.

14. The voltage regulator as claimed in claim 13, wherein the regulation signal is dependent on a difference between the differential signal and the further signal.

15. The voltage regulator as claimed in claim 10, wherein the pulse width modulator further comprises a comparator unit having switching hysteresis, the comparator unit operably coupled to receive the regulation signal, the comparator unit operable to configure the pulse-width-modulated signal dependent upon a comparison of the regulation signal with a first and second threshold value.

16. A voltage regulator comprising:

an output terminal operably connected to provide an output voltage to a load, an output capacitor connected to the output terminal, the output capacitor having an equivalent series resistance (ESR), a converter circuit having supply voltage terminals for the application of a supply voltage, an output coupled to the output terminal, a feedback signal input coupled to receive a feedback signal that is representative of the output voltage, a reference signal input coupled to receive a reference signal, a comparator unit configured to generate a differential signal from the reference signal and the feedback signal, the comparator including a control input operable to receive a control signal, the comparator having a gain factor dependent on the control signal, a switching converter having an inductance and a switching unit providing clocked connection of the inductance to the supply voltage in accordance with a pulse-width-modulated signal, a pulse width modulator configured to generate the pulse-width-modulated signal responsive to a regulation signal, the regulation signal being dependent on the differential signal.

17. A method comprising:

providing a converter circuit having supply voltage terminals for the application of a supply voltage, an output coupled to an output terminal, a feedback signal input coupled to receive a feedback signal that is representative of the output voltage, a reference signal input coupled to receive a reference signal, and a control input operable to receive a control signal, providing an output capacitor connected to the output terminal, the output capacitor having an equivalent series resistance, employing the converter unit to generate an output current having a mean value that is proportional to a difference between the reference signal and the feedback signal, and adjusting the proportionality between the difference and the output current mean value dependent upon the control signal.

18. The method of claim 17, further comprising:

providing the control signal such that the control signal corresponds to the equivalent series resistance of the output capacitor.

19. The method of claim 17, further comprising generating a differential signal from the reference signal and the feedback signal, and wherein the converter unit is configured to provide the output current based at least in part on the differential signal.

20. The method of claim 17, wherein generating the differential signal further comprises generating the differential signal based in part on the control signal.

* * * * *